United States Patent
Perlow et al.

(10) Patent No.: US 7,224,726 B2
(45) Date of Patent: May 29, 2007

(54) SYSTEM AND METHOD FOR TERRESTRIAL HIGH-DEFINITION TELEVISION RECEPTION

(75) Inventors: Randall Perlow, Aliso Viejo, CA (US); Charles Brooks, Laguna Beach, CA (US); Steven Jaffe, Irvine, CA (US); Tianmin Liu, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 629 days.

(21) Appl. No.: 10/109,496

(22) Filed: Mar. 28, 2002

(65) Prior Publication Data

US 2002/0159543 A1 Oct. 31, 2002

Related U.S. Application Data

(60) Provisional application No. 60/279,500, filed on Mar. 28, 2001.

(51) Int. Cl.
*H04H 7/40* (2006.01)

(52) U.S. Cl. ............. 375/233; 375/285; 375/350; 455/134; 455/135; 455/303; 455/306

(58) Field of Classification Search ........ 375/229, 375/230, 233, 285, 340, 346, 350; 455/133–135, 455/296, 303, 306
See application file for complete search history.

(56) References Cited

U.S. PATENT DOCUMENTS

| | | | |
|---|---|---|---|
| 5,127,025 A | 6/1992 | Okanoue | 375/100 |
| 5,203,027 A | 4/1993 | Nounin et al. | 455/134 |
| 5,455,844 A | 10/1995 | Ishikawa et al. | 375/232 |
| 5,644,597 A | 7/1997 | Ueda | 375/232 |
| 6,018,647 A | 1/2000 | Fitzgerald | 455/135 |

OTHER PUBLICATIONS

International Search Report PCT/US02/09464 dated Jul. 11, 2002.

*Primary Examiner*—Dac V. Ha
(74) *Attorney, Agent, or Firm*—McAndrews, Held & Malloy, Ltd.

(57) ABSTRACT

An adaptive receiver is disclosed for optimally receiving and processing signals. The receiver utilizes one or more memory blocks to store groups of incoming symbols. The groups of symbols are processed by a channel estimation subsystem to determine channel characteristics. The receiver determines the appropriate demodulation and decoding strategy to implement based on the determined channel characteristics. The receiver includes a plurality of demodulation and decoding schemes, one of which is selected based on the results of a channel estimation analysis.

9 Claims, 11 Drawing Sheets

SYSTEM AND METHOD FOR TERRESTRIAL HIGH-DEFINITION TELEVISION RECEPTION

CROSS-REFERENCE TO RELATED APPLICATIONS

This application makes reference to, and claims priority to and the benefit of, U.S. provisional application Ser. No. 60/279,500 filed Mar. 28, 2001, which application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to systems for, and methods of, recovering digitally modulated television signals and, more particularly, to a block-based receiver system.

BACKGROUND OF THE INVENTION

Modern digital telecommunication systems are operating at ever-increasing data rates to accommodate society's growing demands for information exchange. However, increasing data rates, while at the same time accommodating the fixed bandwidths allocated by the Federal Communications Commission (FCC), requires increasingly sophisticated signal processing techniques. Since low cost, small size and low power consumption are portent in the hardware implementations of such communication systems, custom integrated circuit solutions are important to achieving these goals.

Next generation digital television systems, such as high-definition television (HDTV) rely on telecommunication transceivers to deliver data at rates in excess of 30 megabits per second (30 Mb/s). The ATSC A/53 Digital Television Standard, was developed by the "Digital HDTV Alliance" of U.S. television vendors, and has been accepted as the standard for terrestrial transmission of HDTV signals in the United States. The ATSC A/53 standard is based on an 8-level vestigial sideband (8-VSB) modulation format with a nominal payload data rate of 19.4 Mbps in a 6 Mhz channel.

Existing digital television (DTV) receivers rely on an equalization structure that applies a feedforward equalizer (FFE) followed by a decision feedback equalizer (DFE), each of which is updated by a decision-based tap-updating algorithm such as the least means squares (LMS) algorithm. Those receivers, due in part to the requirements of the ATSC standard, are designed to work in relatively benign Ricean channels. The receivers are typically not capable of properly functioning under severe Ricean and/or Rayleigh channel conditions. In addition, the ATSC standard does not provide sufficient redundancy in the transmitted signal to facilitate receivers in properly processing the received signal, thereby compounding the problem.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

Aspects of the present invention may be found in an adaptive receiver for optimally receiving and processing signals. In one embodiment, the receiver utilizes one or more memory blocks to store groups of incoming symbols. The groups of symbols are processed by a channel estimation subsystem to determine channel characteristics. The receiver analyzes the channel characteristics and determines an appropriate demodulation strategy to implement. For example, the receiver includes a plurality of demodulation schemes, which are selected based on the results of the channel estimation analysis.

Thus, in one illustrative embodiment, the invention is directed to a receiver that includes; one or more blocks of memory to store a set of incoming symbols, channel estimation circuitry to process the incoming symbols to determine channel characteristics, and plural demodulation subsystems, where one of the subsystems is selected based on the results of the channel estimation analysis.

These and other advantages, aspects and novel features of the present invention, as well as details of an illustrated embodiment thereof, will be more fully understood from the following description and drawings.

DETAILED DESCRIPTION OF THE INVENTION

The following description is made with reference to the appended figures.

Figure 1:
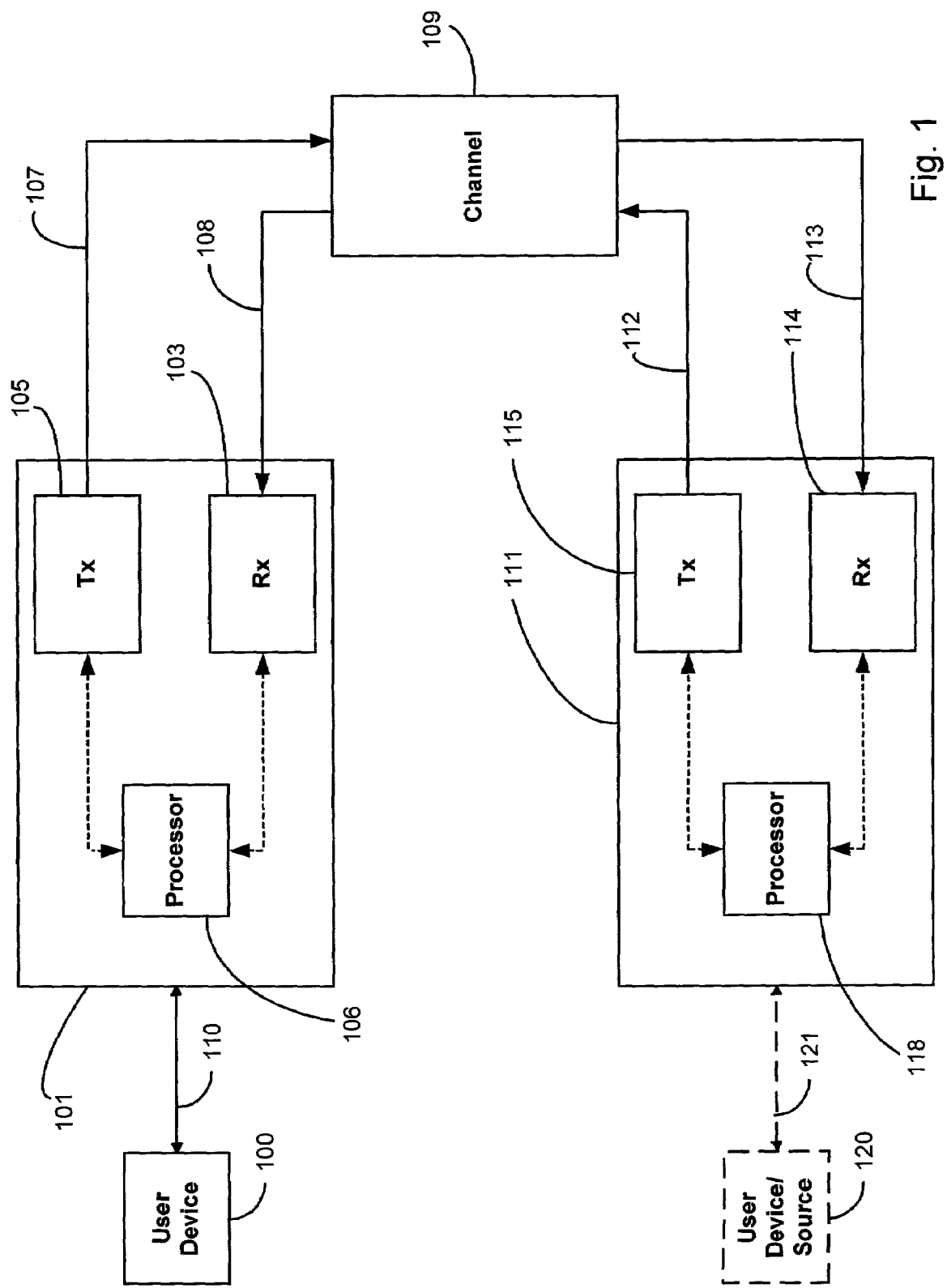
FIG. 1 illustrates a block diagram of a generic communication system that may be employed in connection with one embodiment of the present invention.

FIG. 1 illustrates a block diagram of a generic communication system that may be employed in connection with one embodiment of the present invention. The system comprises a first communication node 101, a second communication node 111, and at least one channel 109 that communicatively couples the nodes 101 and 111. In one embodiment, the first communication node 101 may be, for example, a set top box, and the second communication node 111 may be a headend that transmits DTV or HDTV signals, for example. In another embodiment, the first communication node 101 may be, for example, a cable modem, and the second communication node 111 may be also be a cable modem, or, alternatively, a headend that transmits DTV, HDTV and/or data signals, for example.

The first communication node 101 comprises a transmitter 105, a receiver 103 and a processor 106. In the case where the first communication node 101 is a set top box, the receiver 103 may be an ATSC compliant receiver, for example. In any case, the processor 106 may comprise, for example, a microprocessor. The first communication node 101 is communicatively coupled to a user device 100 (e.g., a television or computer) via communication link 110, and to the channel 109 via communication links 107 and 108. Of course, communication links 107 and 108 may be combined into a single communication link. In addition, the functionality of the user device 100 and the communication node 101 may be combined into a single device, such as a DTV or HDTV television or a computer, for example.

Similarly, the second communication node 111 comprises a transmitter 115, a receiver 114 and a processor 118. The processor 118, like processor 106, may comprise, for example, a microprocessor. The second communication node 111 likewise is communicatively coupled to the at least one channel 109 via communication links 112 and 113. Again, like communication links 107 and 108, the communication links 112 and 113 may also be combined into a single communication link. The communication node 111 may also be communicatively coupled to a user device 120 (again a television or a computer, for example) via communication link 121. In the case when communication node 111 is a headend, for example, user device 120 may not be present, or may instead comprise a television signal source, for example.

During operation of one embodiment of FIG. 1, the user device 100 can receive television information from the source 120 via the second communication node 111, the at least one channel 109 and the first communication node 101. Specifically, the source 120 communicates the information to the second communication node 111 via communication link 121. The information is transformed in the transmitter 115 to match the restrictions imposed by the at least one channel 109. The transmitter 115 then communicates the information to the at least one channel 109 via communication link 112.

The receiver 103 of the first communication node 101 next receives, via communication link 108, the information from the at least one channel 109 and transforms it into a form usable by the user device 100. Finally, the information is communicated from the first communication node 101 to the user device 120 via the communication link 110.

In another embodiment, communication of information from user device 100 to user device 110 may also be achieved in a similar manner. In either embodiment, the information transmitted/received may also be processed using the processors 106/118.

Figure 2:
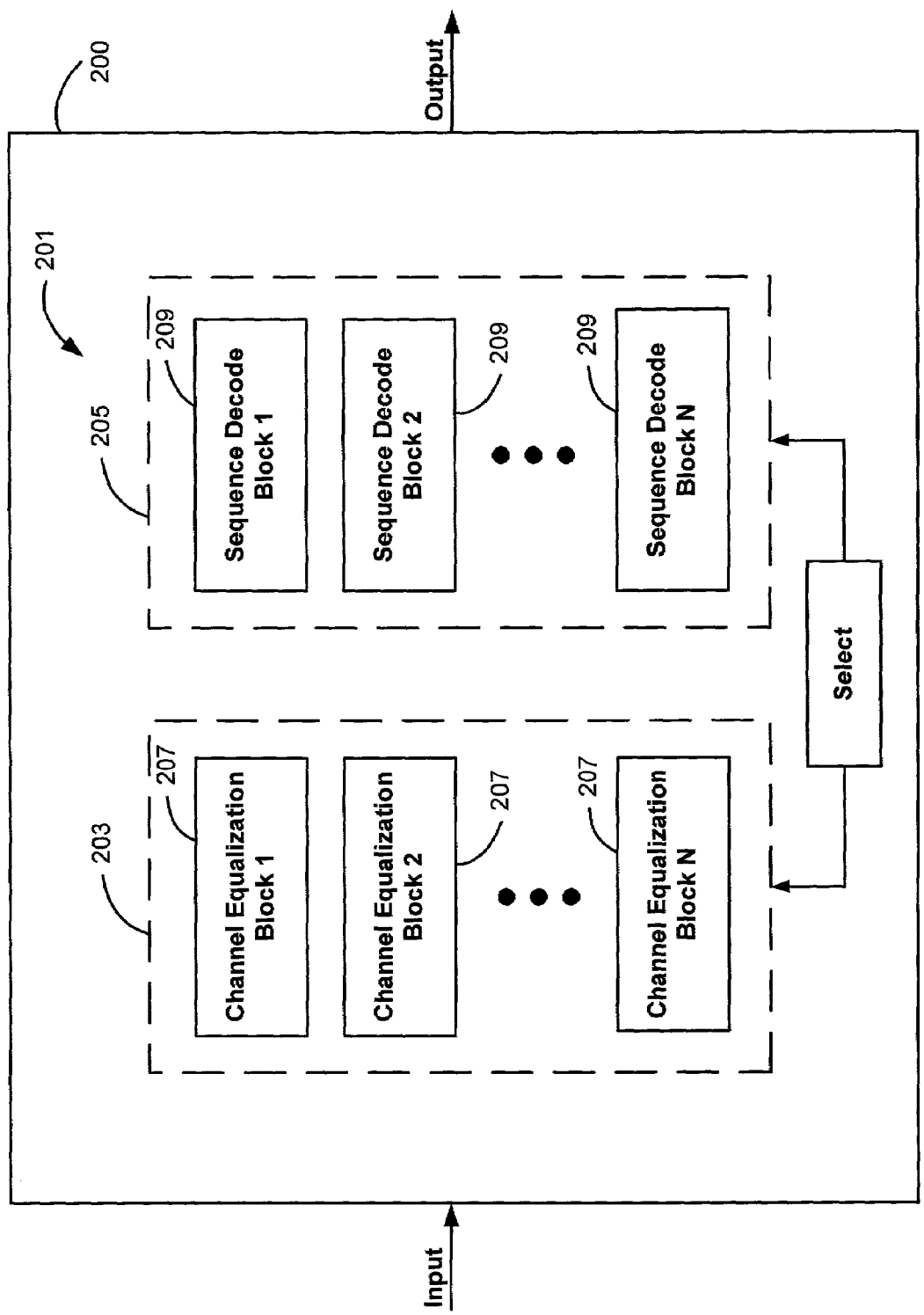
FIG. 2 is a functional block diagram of one embodiment of a receiver in accordance with the present invention.

FIG. 2 is a functional block diagram of one embodiment of a receiver in accordance with the present invention. For example, the functionality of receiver 200 of FIG. 2 may be used for one or both of the receivers 103, 114 in the system of FIG. 1. Receiver 200 comprises a demodulation section 201, which in turn comprises a channel equalization section 203 and a sequence decode section 205. The channel equalization section 203 comprises a plurality of channel equalization blocks 207. Each of the plurality of channel equalization blocks 207 represents a different channel equalization scheme or strategy that may be performed on a signal input to the receiver 200. The receiver 200 is configured to select one of the plurality of equalizations schemes or strategies using available information about the channel, the node in which the receiver resides or the system in general.

Similarly, the sequence decode section 205 comprises a plurality of sequence decode blocks 209. Each of the plurality of sequence decode blocks 209 represents a different decoding scheme or strategy that may be performed on the signal input to the receiver 200. The receiver 200 is also configured to select one of the plurality of decoding schemes or strategies using available information about the channel, the node in which the receiver resides or the system in general.

Once the receiver 200 selects and performs the appropriate channel equalization on the input signal and selects and performs appropriate decoding, the receiver outputs digital data for further processing (e.g., for display).

Receiver 200 may be embodied in a single integrated circuit that is coupled to other components within a node in which the receiver 200 resides. Alternatively, the receiver 200, as well as transmitter and other processing functionality, may all be incorporated in a single monolithic integrated circuit. In any case, the circuits may be constructed in CMOS or other semiconductor technology (such as, for example, PMOS, NMOS, Bipolar, etc.).

Figure 3:
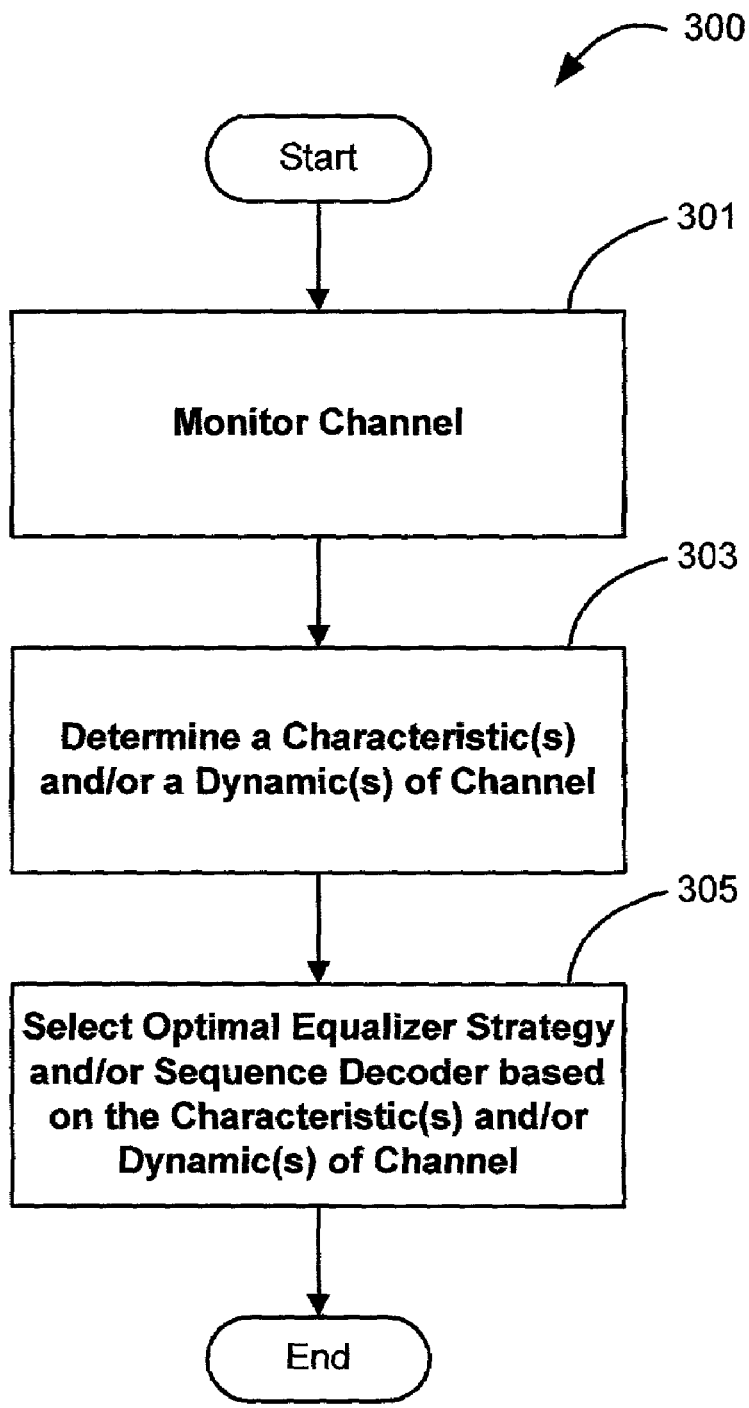
FIG. 3 illustrates a method that may be employed in accordance with one embodiment of the present invention.

FIG. 3 illustrates a method that may be employed in accordance with one embodiment of the present invention. Method 300 may be performed upon initialization of the system, for example, and may be performed solely by the receiver 200 of FIG. 2 for example, or by (or in combination with) some other component of the system. In one embodiment, the method 300 begins with the receiver monitoring the channel (block 301). The receiver then determines one or more characteristics and/or one or more dynamics of the channel (block 303). For example, the receiver may determine an echo profile or noise estimate of the channel. The receiver next selects, based on the channel characteristic(s) and/or dynamic(s) determined, a demodulation strategy that suits the channel (block 305). In other words, for example, one or both of an optimal equalizer strategy and a sequence decoder are selected for operation of the receiver based on the channel.

Figure 4:
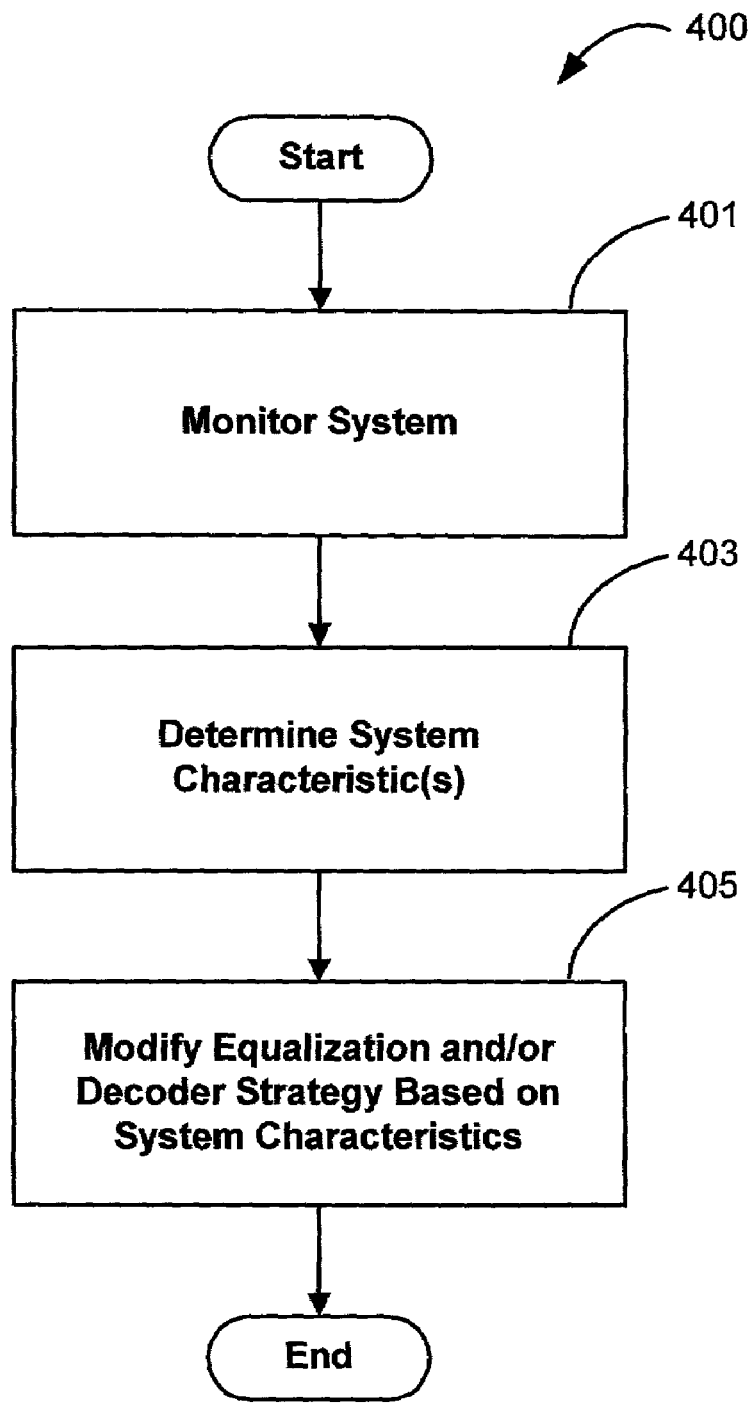
FIG. 4 illustrates another method that may be employed in accordance with one embodiment of the present invention.

Selection of an optimal demodulation strategy may also be a dynamic process. FIG. 4 illustrates a method that may be employed in accordance with one embodiment of the present invention, after initialization of the system, for example. Like the method of FIG. 3, the method 400 may also be performed solely by the receiver 200 of FIG. 2 for example, or by (or in combination with) some other component of the system. Method 400 begins as the receiver monitors the system (block 401). The system as such may comprise, for example, one or both of the channel or the receiver. The receiver then determines one or more characteristics of the system (block 403). Such characteristics may comprise, for example, an echo profile of the channel, a state of the selected equalizer in the receiver, the bit error rate coming out of the selected decoder in the receiver, a noise estimate based on the symbol decisions in the receiver, or some combination thereof. Based on the determined characteristic or characteristics, the receiver next modifies one or both of the currently selected equalization strategy and decoder strategy for operation of the receiver. Modification, as such, may mean simply a modification of certain characteristics of one or both of the currently selected strategies to aid in demodulation, or the selection of an entirely new equalization and/or decoder strategy or strategies.

Figure 5:
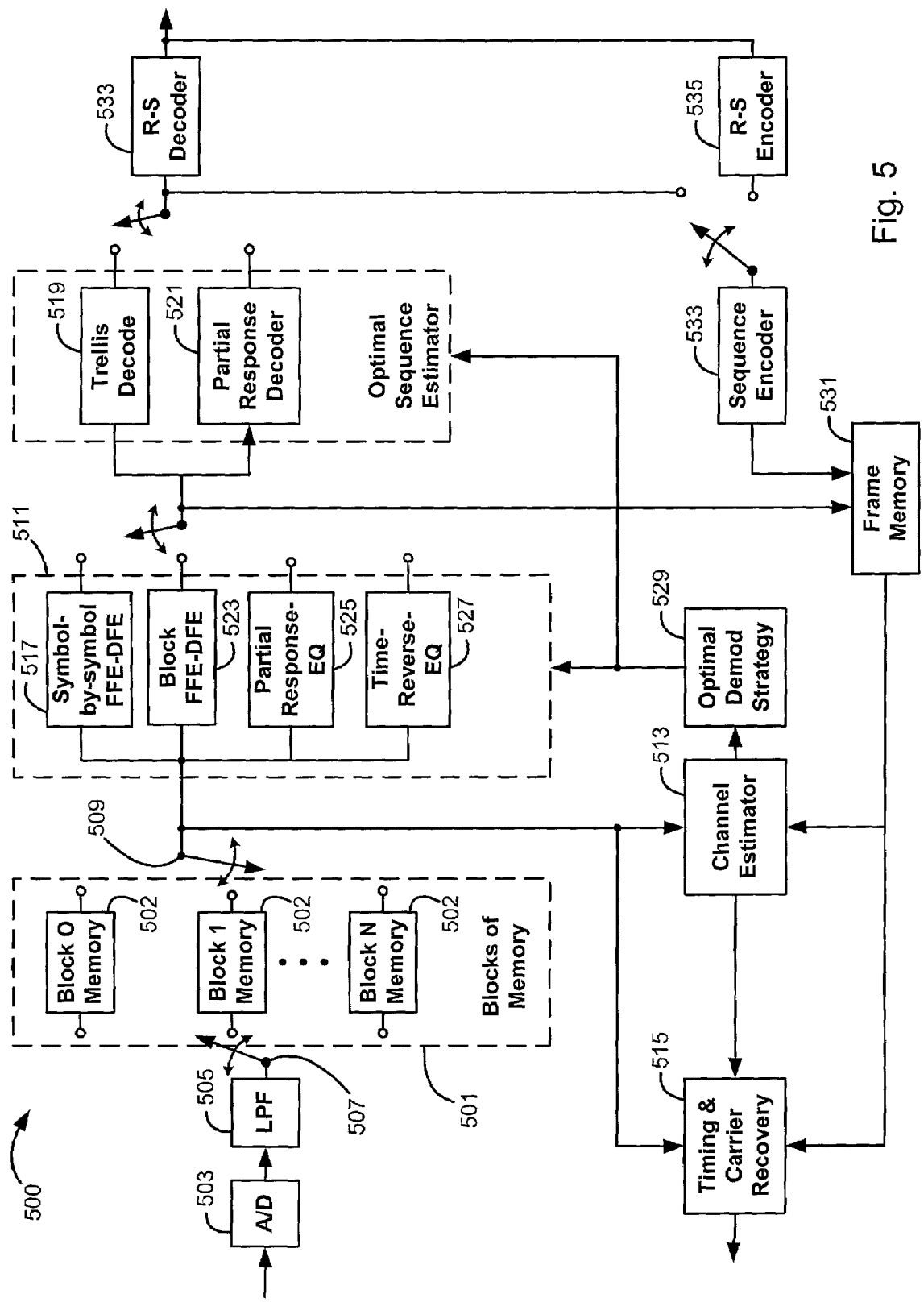
FIG. 5 is a schematic block diagram of an adaptive receiver architecture in accordance with one embodiment of the present the invention.

FIG. 5 is a schematic block diagram of an adaptive receiver architecture that may perform the methods of FIGS. 3 and 4, in accordance with one embodiment of the present the invention. Receiver 500 is capable of switching between demodulation schemes based on sensed channel and/or system conditions. Receiver 500 may comprise a front-end buffer 501 having a plurality of memory blocks 502, each of which stores a set of sequential symbols that have been received, converted by an analog-to-digital converter 503, and filtered by a low-pass filter 505. Each block of memory 502 stores a predetermined number of symbols, based on the size of the blocks. Once a particular block has received the predetermined number of symbols, a switch 507 is flipped to deliver the next set of symbols to another of the memory blocks 502.

A second switch 509 controls which block of memory 502 is used as the output of the buffer 501. The output of the buffer 501 is introduced, in parallel, to a plurality of demodulation subsystems (i.e., channel equalizer blocks), generally designated 511. In addition, the output of the buffer 501 is introduced to channel estimation circuitry 513, and to timing and carrier recovery subsystems 515.

The channel estimation circuitry 513 receives a set of symbols from one of the memory blocks 502, and analyzes the set of symbols to determine one or more channel characteristics. By monitoring the training sequence that is periodically transmitted by a transmitter, certain characteristics of the channel can be determined, for example, how many multipath signals are being received, how strong those signals are (e.g., how strong is the echo), an estimate of the noise, and the like. There are numerous known ways of performing channel estimation to determine channel characteristics.

Receiver 500 may comprise a conventional, symbol-by-symbol equalizer block 517 that includes a feedforward equalizer and decision feedback equalizer, which are operative to cancel, respectively, pre-echo and post-echo. The symbols are then transmitted to a forward error correction component, such as a Trellis decoder 519 and partial response decoder 521. The equalizer block 517 is typically selected for equalizing the symbols in the memory blocks 502 when the estimation circuitry 513 determines that there are weak echos in the channel and the dynamics of the channel characteristics are slowly varying, or when a reliable estimate of the channel characteristics cannot be obtained by the estimation circuitry 513.

Receiver 500 may also comprise a block-based equalizer 523 that simultaneously operates on a block a symbols, rather than on a symbol-by-symbol basis. In one embodiment, equalizer 523 initially uses the Fourier transform or discrete cosine transform on the symbols to transform them into the frequency domain. Equalizer 523 then filters the entire block of symbols, and transforms the symbols back to the time domain. This embodiment is typically selected when the estimation circuitry 513 determines that there are weak echos in the channel but the channel characteristics are fast varying, or when a reliable estimate of the channel characteristics cannot be obtained by the estimation circuitry 513. In another embodiment, equalizer 523 processes an entire block of symbols to obtain the channel characteristics and then determines a set of optimized filter coefficients for the block. This embodiment is typically selected when the channel characteristic can be reliably determined by the estimation circuitry 513.

Receiver 500 may also comprise a partial response equalizer block 525 that combines multi-path signals rather than canceling echos. For example, if the channel includes the main path and one significant echo delayed by one or more symbol periods, block 525 combines the two signals together and then decodes the combined signal. In one embodiment, block 525 incorporates a Viterbi decoder to decode the combined output.

Equalizer block 525 is typically used when the estimation circuitry 513 determines that the channel includes a relatively small number of strong echos in addition to the main signal path. For example, block 525 may be selected when there are from one to about four echos detected by the estimation circuitry 513.

Receiver 500 may farther comprise a time-reverse equalizer block 527 that is operative to process the block of symbols in reverse order. Block 527 is used when the channel is determined to have strong pre-echos. Thus, the set of symbols is stored in a block 502, and once the channel estimation circuitry 513 determines that the channel is experiencing a large pre-echo, the set of symbols is delivered to block 527 and processed in reverse order. In that case, the pre-echo becomes a post-echo, which is generally easier to filter out through the use of decision feedback equalizers.

By engaging in channel estimation determinations, receiver 500 achieves an additional improvement over conventional receivers. Channel estimation circuitry 513 analyzes a block of symbols from a memory block 502, and uses the training symbols in the block to determine the channel characteristics, such as where any echos are, how strong those echos are, and the like. With such knowledge, estimation circuitry 513 outputs corresponding information to an optimal demodulation strategy block 529 and to the timing and carrier recovery block 515. Demodulation strategy block 529 selects the proper demodulation subsystem (e.g., channel equalization block or system), as well as an appropriate set of coefficient values for the equalizers of the selected block to implement, based on the information received from estimation circuitry 513. Such selection may also occur with an input to the block 511 from the timing and carrier recovery block 515. Thus, at least some number of the taps in the equalizer(s) of the selected demodulator are initially set to non-zero values, compared to a conventional equalizer in which the main tap is set to one, the other taps are all set to zero, and the equalizer requires a relatively long time for the tap values to converge to a state where the performance of the receiver is maximized.

The demodulation strategy block 529 also controls the selection of the Trellis decoder 519 or partial response decoder 521, again based on the information received from estimation circuitry 513.

Moreover, in between training sequences, receiver 500 uses the decoded data to estimate a channel's conditions and design a new set of coefficients, rather than relying on a symbol-by-symbol basis to update those coefficients. According to this aspect of the invention, after decoding the lines of data in a block, receiver 500 determines whether the decoded block of data is mostly correct (i.e., whether there are very few errors in the decoded data). This is accomplished by looking at the forward error correction (FEC) result. If the block is deemed to be acceptable, then that block of data is used by the channel estimation circuitry 513 to determine the channel characteristics, select a channel equalizer block, and design a new set of coefficients for the selected channel equalizer block. Then, as the receiver 500 demodulates the incoming symbols, the filter taps can be updated on a symbol-by-symbol basis, as is done conventionally. Thus, receiver 500 utilizes both a block-based and symbol-to-symbol based process to adapt the filter coefficients.

The receiver 500 may further comprise a frame memory block 531, sequence encoder 533, and Reed-Solomon (R-S) encoder 535, which cooperate to acquire acceptable blocks of demodulated data and deliver those blocks to the channel estimation circuitry 513, as described above.

Receiver 500 not only is adaptable by means of selecting between plural channel equalizer blocks, it also selects between the trellis decoder 519 and partial response decoder 521. Thus, based on the channel equalizer block selected by channel estimation circuitry 513, either the trellis decoder 519 or partial response decoder 521 is selected to decode the equalized symbols. In one embodiment, the partial response decoder 521 is selected when the channel estimation circuitry 513 determines that there are from 1 to about 4 strong echos in the channel.

The output of the selected decoder is then introduced to a Reed-Solomon (R-S) decoder 533 to further decode the data, and also to the sequence encoder 533. The output of the R-S decoder 533 is output as the received bit stream, and is also delivered to the R-S encoder 535.

While receiver 500 is shown in one embodiment as including four channel equalizer blocks 517, 523, 525 and 527, it should be understood that receiver 500 may include more or less than four channel equalization blocks, and that the types of channel equalization blocks may be different from those disclosed in the illustrated embodiment. In addition, it should also be understood that receiver 500 may include more or less than two decoder blocks, and that the type of decoder blocks may differ from those described herein.

Moreover, while in one embodiment receiver 500 includes a plurality of memory blocks 502, it should be understood that receiver 500 may include a single memory block 502. A plurality of memory blocks is used in FIG. 5 to take advantage of iterative processing to improve the overall decoding process over time. In the situation when a single memory block is instead used, a set of symbols is stored in a single block 502 and processed by estimation circuitry 513 while the receiver 500 continues to process the incoming symbols. Once the channel characteristics are determined, the corresponding channel equalization and decoding blocks are selected, and the process is repeated.

Based on the above, it should be understood that the receiver of FIG. 5 enables the determination of channel and/or receiver characteristics, and the selection and assistance of appropriate channel equalization and decoding techniques based on those characteristics.

Figure 6:
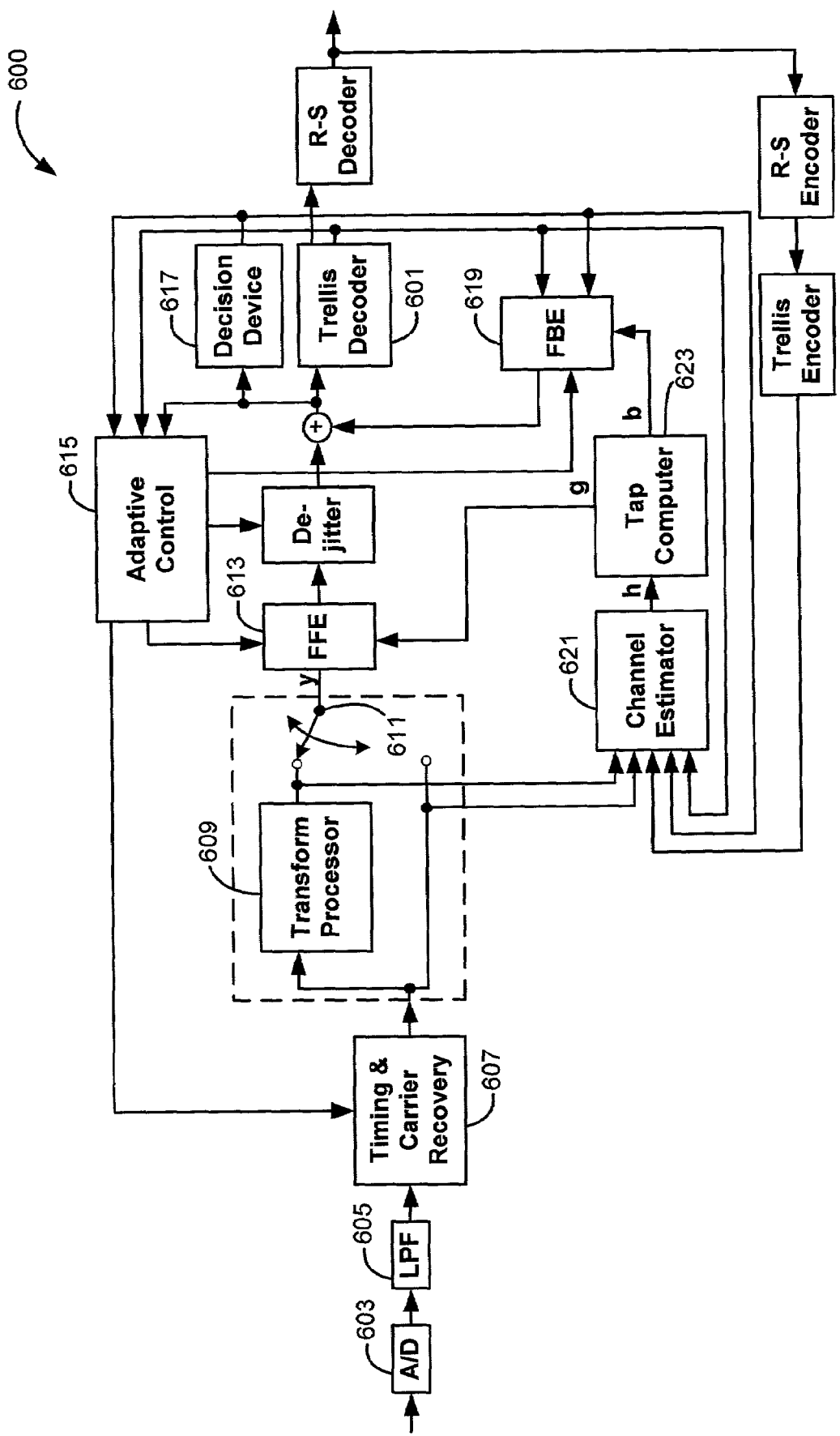
FIG. 6 is a schematic block diagram of one illustrative implementation of the receiver shown in FIG. 5.

FIG. 6 is a schematic block diagram of one illustrative implementation of the receiver shown in FIG. 5. The receiver 600 of FIG. 6 uses only a single sequence decoder, namely Trellis decoder 601, and uses two channel equalization schemes, namely an adaptive control (symbol-by-symbol based) scheme and a channel estimation (block based) scheme.

In operation of receiver 600, symbols are received, converted by an analog-to-digital converter 603, and filtered by a low-pass filter 605. The output of low-pass filter 605 is then input to a timing and carrier recovery circuit 607. The output of timing and carrier recovery circuit 607 is input to an optional transform processor 609. The transform processor 609 may be selected or bypassed using switch 611. Transform processor 609 may be selected when there is a strong echo in the channel, and is similar to a Fast Fourier Transform or Discrete Cosine Transform. The transform processor 609 improves the adaptive performance of the FFE 613 using a LMS algorithm, for example. Its general purpose is to reduce correlation (i.e. the eigenvalue spread) in the data going to the Feed Forward Equalizer (FFE) 613. The transform processor 609 improves stability and enables faster convergence of the LMS algorithm.

It should be understood that the order of the timing and carrier recovery circuit 607 and transform processor 609 may be reversed from that shown in FIG. 6.

As mentioned above, the system of FIG. 6 uses two channel equalization schemes. The traditional adaptive control (symbol-by-symbol based) scheme corresponds to block 517 of FIG. 5, for example, and generally comprises an adaptive control block 615, the FFE 613, and a decision feedback equalizer portion generally comprised of FBE 619 with inputs from decision device 617 and trellis decoder 601. The adaptive control block 615 performs an LMS or RLS (recursive least squares) algorithm, for example, for adaptively modifying the coefficients of FFE 613 and FBE 619. Symbols from FFE 613 are transmitted to Trellis decoder 601, which is a forward error correction component of the receiver, and corresponds to block 519 of FIG. 5, for example. The adaptive control block 615 and the FBE 619 also each take an input from Trellis decoder 601. The adaptive control equalization scheme of FIG. 6 is typically selected for equalizing symbols when a channel estimation portion of FIG. 6 determines that there is no or very little echo in the channel, or when a reliable estimate of the channel cannot be obtained.

The channel estimation (block based) equalization scheme of FIG. 6 corresponds to block 523 of FIG. 5, for example, and generally comprises a channel estimator 621, a tap computer 623, the FFE 613, and a decision feedback equalizer portion generally comprised of FBE 619 with inputs from decision device 617 and trellis decoder 601. Channel estimator 621 processes both forward and feedback data and outputs a set of coefficients reflective of channel conditions (e.g., echo profile). The tap computer 623 takes the result from the channel estimator 621 and computes an optimal set of coefficients for the FFE 613 and FBE 619. Symbols from FFE 613 are transmitted to Trellis decoder 601, which again is a forward error correction component of the receiver, and corresponds to block 519 of FIG. 5, for example. The FBE 619 also takes an input from Trellis decoder 601 (i.e., feedback equalization is performed through a partial Trellis decode). The channel estimation equalization scheme of FIG. 6 is typically selected for equalizing symbols when a reliable estimate of the channel can be obtained by the channel estimator 621.

Thus, in the embodiment of FIG. 6, the taps of the FFE 613 and FBE 619 can be adaptively computed using the adaptive control equalization scheme when the echo profile contains weak echoes or when the estimated channel characteristics are unreliable, for example, and can be directly computed using the channel estimation equalization scheme when there are reliable estimates of the channel characteristics at the output of the channel estimator. Reliable channel characteristics can typically be obtained when the transmitted data symbols are known (such as during transmission of a repetitive training sequence) or when correct symbols can be obtained from the previously equalized and decoded data. The estimated characteristics produced from the channel estimator are unreliable when known (or correct) data symbols are not available at the input to the estimator, when the noise in received data symbols is large, or when the spread of the channel echos exceeds the span of the estimator.

The functionality of channel estimator 621 of FIG. 6 may simply be performed using the following equation:

$$h=(D^+)(y), \text{ where } D^+=[D^H D]^{-1} D^H$$

In other words, the result of the channel estimator 621, h, is simply the product of a pseudo-inverse of a known data matrix, $D^+$, and the input data, y, to FFE 613, and represents a set coefficients reflective of channel conditions for input to the tap computer 623.

Figure 7:
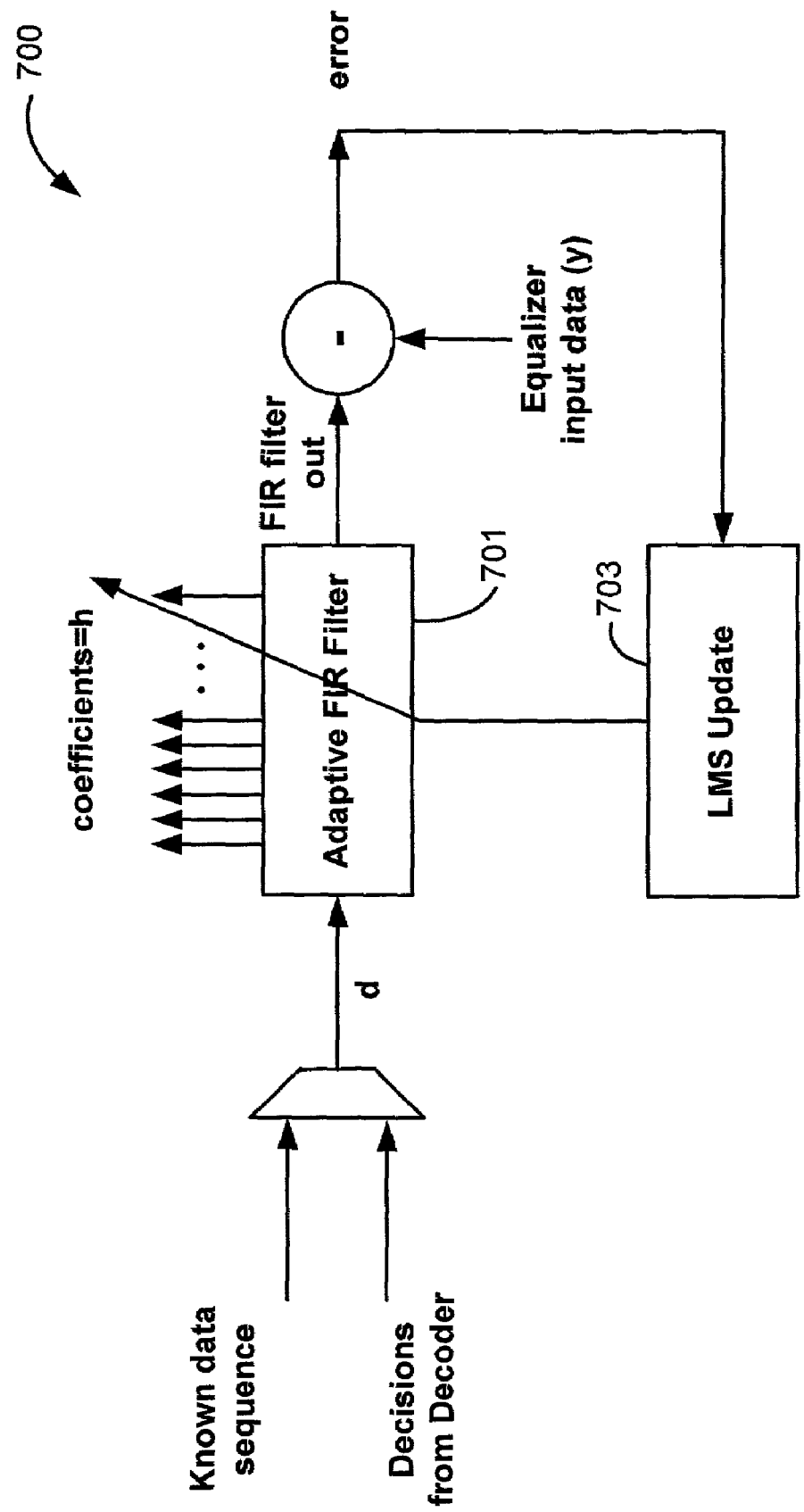
FIG. 7 illustrates one embodiment of the channel estimator of FIG. 6.

FIG. 7 illustrates an alternative embodiment of the channel estimator 621 of FIG. 6. In this embodiment, channel estimator 700 comprises an adaptive FIR filter 701 that outputs a set of coefficients, h, which are reflective of channel conditions and are input to the tap computer 623. Specifically, an error estimate, e, is generated using the output of FIR filter 701 and the input data, y, to FFE 613. The error estimate is fed to an LMS block 703 to update the coefficients h using the following equation, for example:

$$h_{new,k} = h_{old,k} + \mu e d_k$$

where "$\mu$" is the step size and "d" represents a multiplexed output of a known data sequence and decisions from the decoder.

Figure 8:
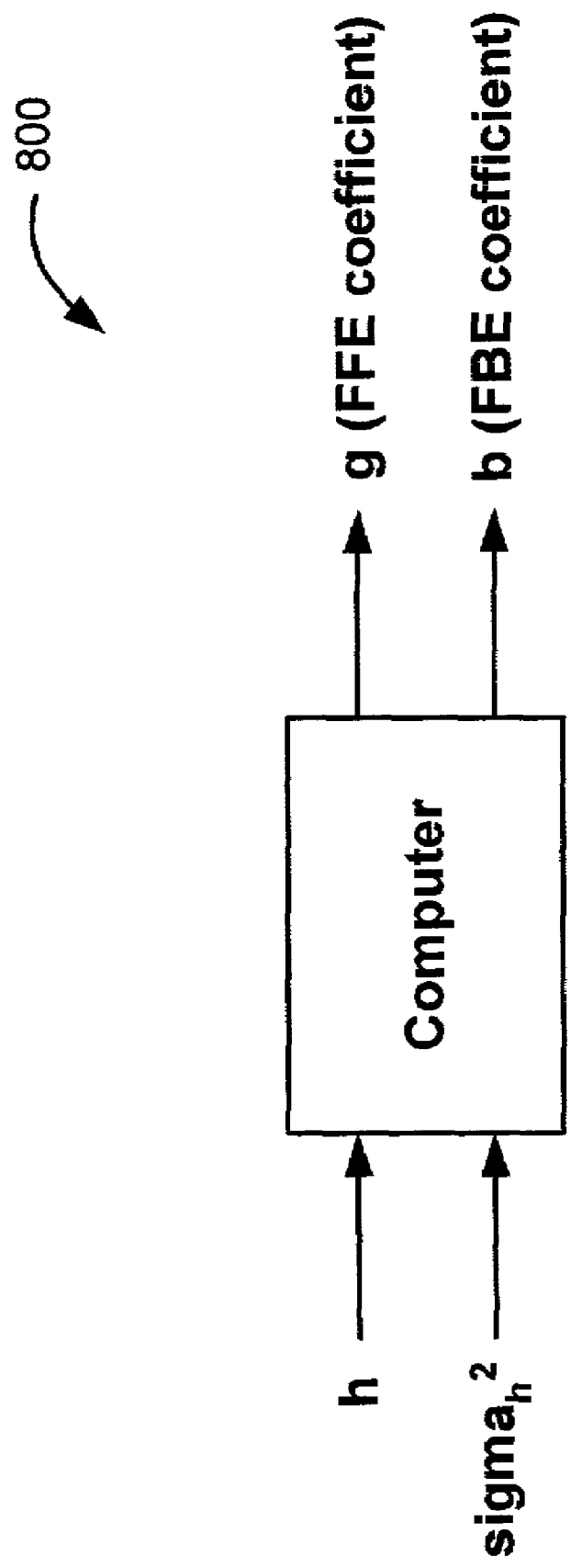
FIG. 8 illustrates one embodiment of the tap computer of FIG. 6.

In either case, the coefficients h generated by channel estimator 621 are fed to the tap computer 623 of FIG. 6. FIG. 8 illustrates one embodiment of the tap computer 623. Tap computer 800 of FIG. 8 receive the coefficients h from the channel estimator, and uses a noise parameter, $\sigma_h^2$, to compute FFE 613 coefficients, g, and FBE 619 coefficients, b. The noise parameter can either be fabricated or estimated based on symbol decisions. Variation of the noise parameter will affect the characteristics of coefficients f and g. In general, the higher noise parameter gives a smaller b and can help stability at the cost of output signal quality. Additional detail regarding the computation of the FFE and FBE coefficients can be found in co-pending patent application Ser. No. 10/044,013 entitled "Fast Computation of Decision Equalizer Coefficients" filed Oct. 26, 2001, which application is hereby incorporated herein by reference in its entirety.

Figure 9:
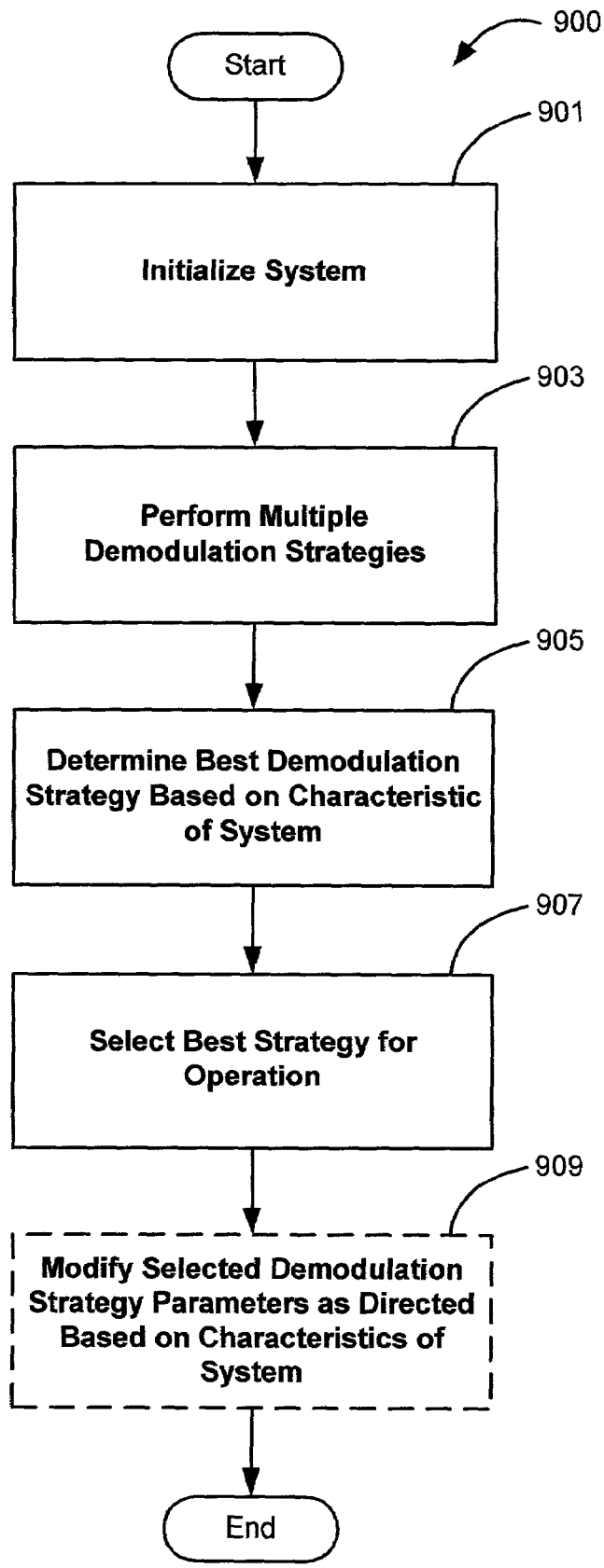
FIG. 9 illustrates one embodiment of a method that may be employed by the receivers of FIGS. 5 and 6.

FIG. 9 illustrates one embodiment of a method that may be employed by the receivers 500 and 600 of FIGS. 5 and 6. The method 900 begins with the initialization of the system (block 901). Such initialization may comprise the method 300 discussed above with respect to FIG. 3, for example. Multiple demodulation strategies are then performed (block 903), such as, for example, the adaptive control strategy and the channel estimation strategy discussed above with respect to FIGS. 5 and 6. Next, a best demodulation strategy is determined based on a characteristic of the system (block 905), such as, for example, the bit error rate or the noise estimate from the symbol decisions. The determined best strategy is selected for operation (block 907), and parameters of the selected strategy may be modified as directed based on characteristics of the system (block 909). For example, if the channel estimation strategy is selected, the inputs to the tap computer may be modified, and if the adaptive control strategy is selected, the rate of adaptation of the LMS may be modified. In other words, the method 900 not only permits selection of the optimal demodulation strategy, but also provides assistance to the selected strategy.

Figure 10A:
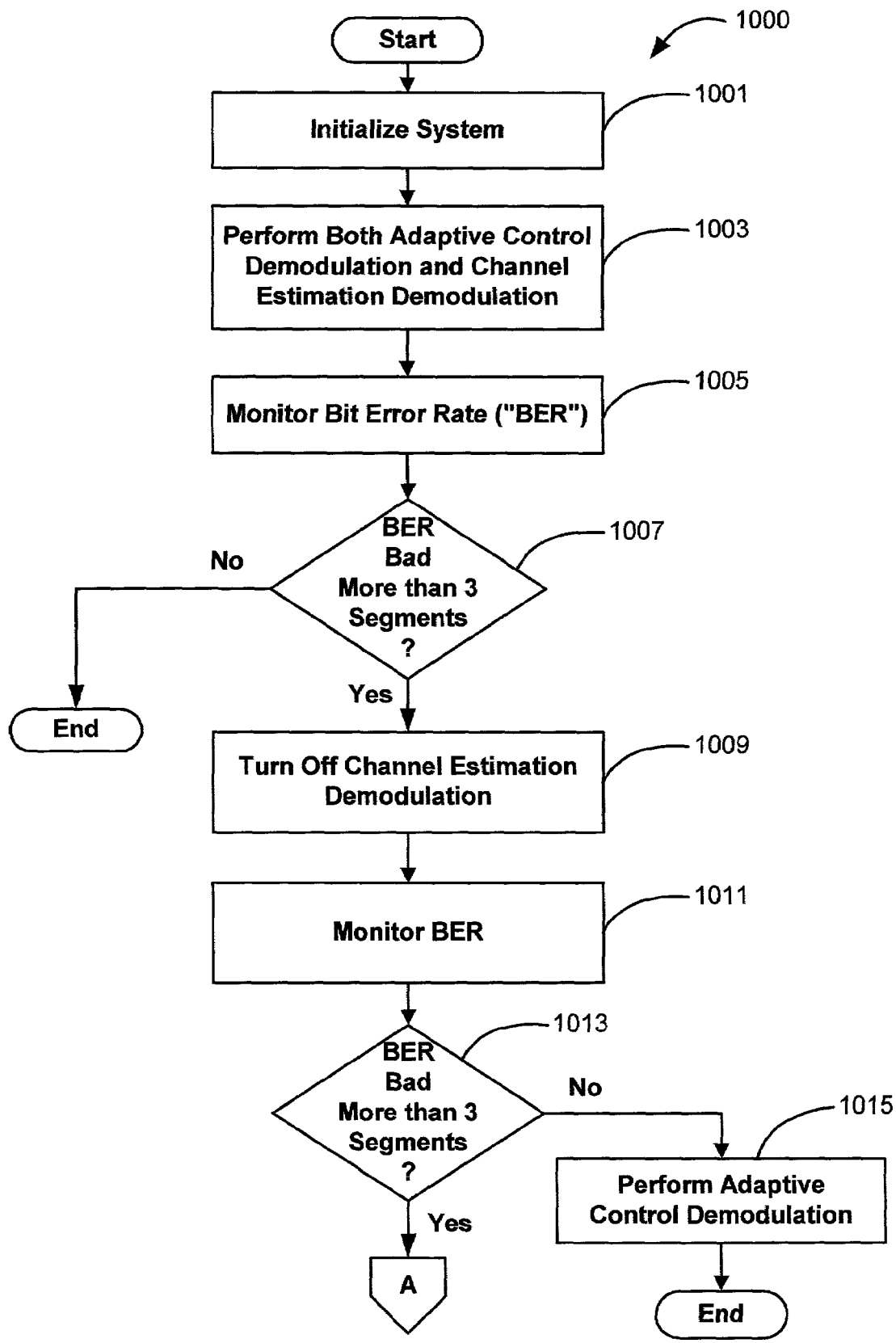
FIGS. 10A and 10B illustrate another embodiment of a method that may be employed by the receivers of FIGS. 5 and 6.
Figure 10B:
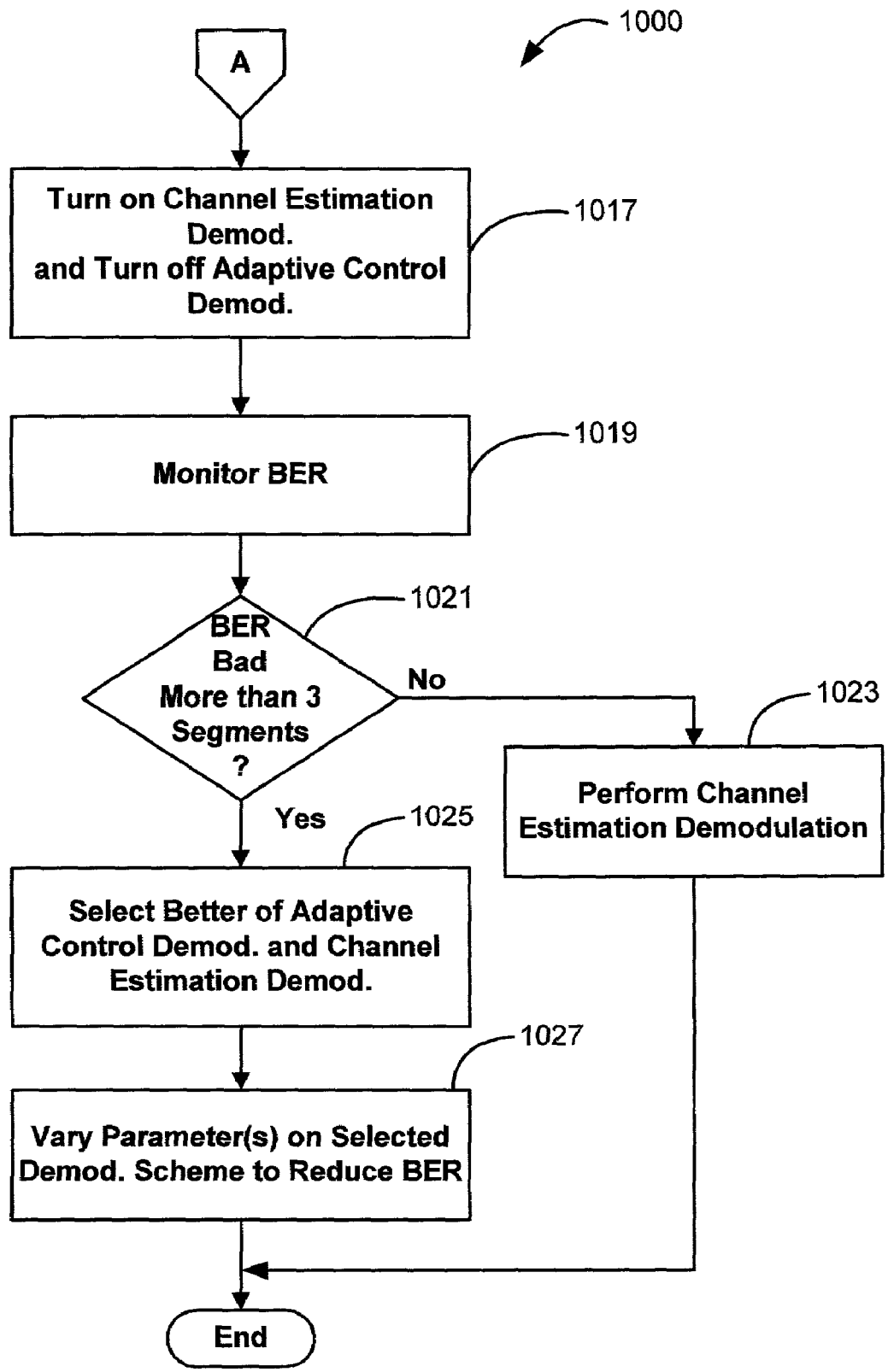

FIGS. 10A and 10B illustrate another embodiment of a method that may be employed by the receivers 500 and 600 of FIGS. 5 and 6. The method 1000 begins with the initialization of the system (block 1001). Such initialization may again comprise the method 300 discussed above with respect to FIG. 3, for example. Both the adaptive control strategy and the channel estimation strategy discussed above with respect to FIGS. 5 and 6 are then performed (block 1003). The bit error rate ("BER") is monitored (block 1005), and if it is determined that the BER is not bad more than 3 segments (block 1007), the receiver operates using both the adaptive control strategy and the channel estimation strategy. If however, the BER is bad more than 3 segments (block 1007), the channel estimation demodulation scheme is turned off (block 1009), and the BER is again monitored (block 1011). If it is determined that the BER is not bad more than 3 segments (block 1013), the receiver operates using the adaptive control strategy (block 1015). If however, the BER is bad more than 3 segments (block 1013), the channel estimation demodulation scheme is turned back on and the adaptive control demodulation scheme is turned off (block 1017), and the BER is again monitored (block 1019). If the BER is not bad more than 3 segments (block 1021), then the receiver operates using channel estimation demodulation (block 1023). If, however, it is again determined that the BER is bad more than 3 segments (block 1021), the better scheme is selected (block 1025). The "better" scheme may be the one that ran longer before failure, for example. In any case, parameters on the selected scheme are reduced as appropriate to reduce the BER (block 1027). For example, if the adaptive control (symbol-by-symbol based) scheme is selected, the step size can be varied, and if the channel estimation (block based) scheme is selected, the update rate and/or noise level going into the tap computer can be varied.

Also, it should be understood that the adaptive control demodulation may first be turned off at block 1009, rather than the channel estimation demodulation (i.e., the order can be reversed).

The receivers 500 and 600 of FIGS. 5 and 6 can be implemented, for example, as ATSC A-53 receivers.

Many modifications and variations of the present invention are possible in light of the above teachings. Thus, it is to be understood that, within the scope of the appended claims, the invention may be practiced otherwise than as described hereinabove.

The invention claimed is:

1. A receiver for processing signals received over a communication channel comprising:
   a trellis decoder operable to decode received symbols;
   a partial response decoder operable to decode received symbols; and
   circuitry that determines at least one characteristic of at least one of the receiver and the channel, and selects one of the trellis decoder and the partial response decoder for decoding received symbols based on the at least one characteristic determined.

2. The receiver of claim 1 further comprising at least one memory block that buffers the received symbols.

3. The receiver of claim 2 wherein the circuitry receives at least one symbol from the at least one memory block and uses the at least one symbol received in determining the at least one characteristic.

4. The receiver of claim 1 wherein the circuitry modifies at least one characteristic of the selected one of the trellis decoder and the partial response decoder based on at least one characteristic of at least one of the receiver and the channel.

5. The receiver of claim 1 wherein the at least one characteristic comprises at least one of an echo profile of the channel, a noise estimate, a bit error rate, and a state of the selected one of the trellis decoder and the partial response decoder.

6. The receiver of claim 1 comprising an ATSC-A 53 compliant receiver.

7. A method of processing signals received over a communication channel comprising:
   receiving a plurality of symbols by a receiver;
   determining at least one characteristic of at least one of the communication channel and the receiver using at least a portion of the plurality of symbols received; and
   selecting one of a trellis decoder and a partial response decoder for decoding received symbols based on the at least one characteristic determined.

8. The method of claim 7 further comprising buffering the plurality of symbols prior to the determining.

9. The method of claim 7 comprising repeating the steps of receiving and determining, and further comprising modifying a characteristic of a selected one of the trellis decoder and the partial response decoder based on the at least one characteristic.

* * * * *